Dec. 27, 1955　　　　　　　A. BRAUSS　　　　　　2,728,611
TRACK COMPENSATING APPARATUS
Filed May 1, 1953　　　　　　　　　　　　　　2 Sheets-Sheet 1
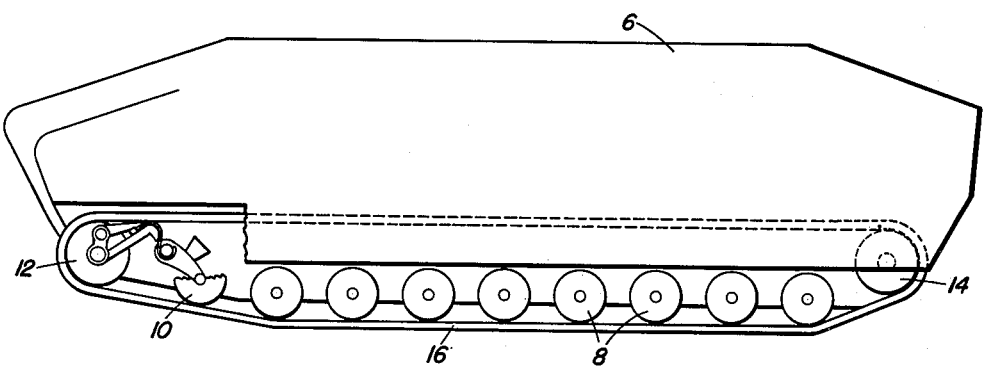
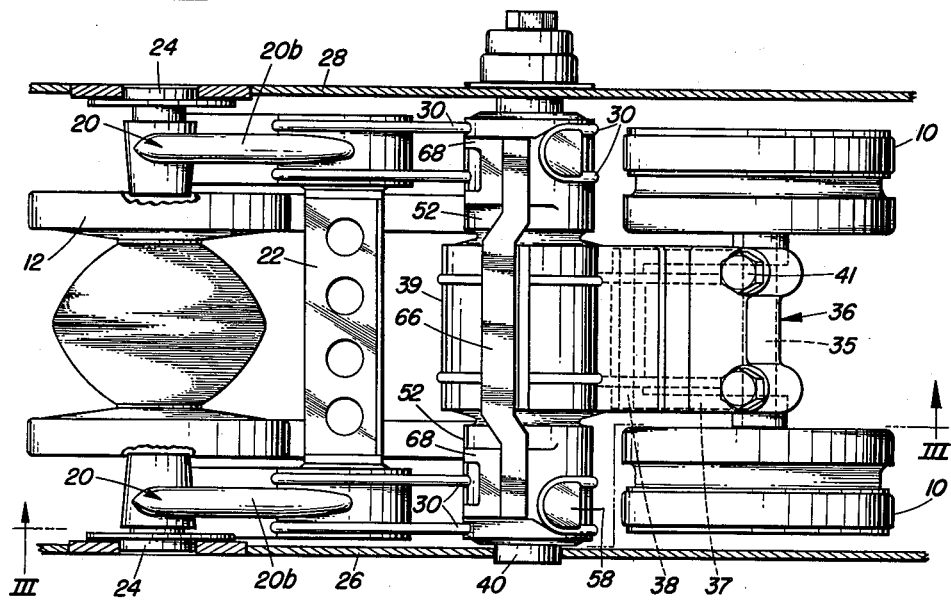
INVENTOR.
Albert Brauss

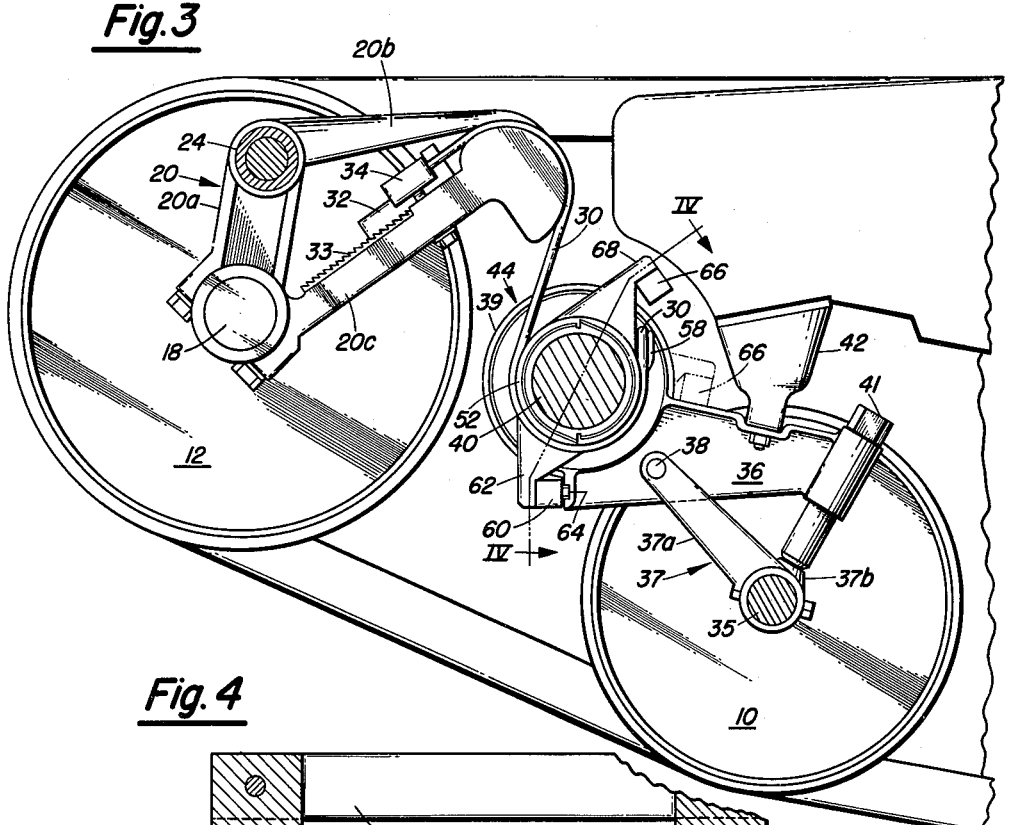

United States Patent Office 2,728,611
Patented Dec. 27, 1955

2,728,611

TRACK COMPENSATING APPARATUS

Albert Brauss, Redmond, Wash., assignor, by mesne assignments, to the United States of America as represented by the Secretary of the Navy Application May 1, 1953, Serial No. 352,377

5 Claims. (Cl. 305—9)

This invention relates to endless track propulsion vehicles and, more particularly, to track tension compensating apparatus capable of taking-up or paying-out slacked track as the need for it arises.

Endless track propulsion is used for many types of vehicles, such as tractors, caterpillars and both land and amphibious tanks, all of which have in common the problem of controlling the varying track tensions as the vehicle proceeds over rough terrain, or as rocks, dirt, and other foreign material find their way into and become lodged in the track catenary. Such control is essential because driving characteristics, maneuverability and smoothness of operation all depend to a degree upon an ability to maintain an optimum track tension, and the need for the control has been recognized in various proposed wheel suspensions most of which function on a swinging catenary principle to pivotally permit one sprocket to yield slack as another demands it.

However, an arrangement of this type, or its equivalent, operates satisfactorily only to a limited extent, the reason for this being that such a fixed, dependent swinging movement of the sprockets fails to take into consideration the fact that at certain times it is most desirable to have one or more of the sprockets yield independently so as to create a slack in the track. For instance, such additional slack is desirable when rocks, dirt, etc., become lodged and are unable to work loose, because, as would be expected, their presence materially increases the over-all track tension far beyond the limit desired and possibly to an extent that might produce breakage or, perhaps, cause the sprocket teeth to ride out of and skip the track. The damaging nature of such increased track tensions, due to foreign matter, also has been recognized, and here again various devices have been proposed to counteract it. In particular, the need for relieving such excess tension has been recognized in amphibious tanks which frequently are purposely designed to situate the drive sprocket close to the ground. In such designs, any slack accumulation between this rear drive sprocket and its adjacent bogie wheel is very apt to result in the lodging of rocks, etc. as the low sprockets scrape the ground during turns. However, so far as is presently known, no suitable apparatus has been provided which will automatically release slack to free these foreign objects and, at the same time, operate effectively to maintain constant control over track tension during normal or rock-free operation.

Accordingly, one of the objects of the present invention is to provide a track compensating apparatus which is capable of maintaining a desired track tension during normal operation, and also capable, when the track tension is excessively increased by the presence of foreign objects, of yielding sufficient slack to permit these objects to work free.

A more specific object is to provide track compensating apparatus in which certain of the catenary elements are capable of inter-dependent movement for maintaining a constant track tension under normal operating conditions, but which, when operating conditions introduce tension-increasing foreign objects into the catenary, are capable of independent movement to provide such slack as is necessary to permit the objects to work free.

A similar object is to provide a track compensating linkage which has a fixed geometry capable of adjustments for effecting and maintaining a desired constant tension, the linkage also being capable of relieving track tension without disturbing its adjusted and fixed geometry.

These and other objects will become apparent upon an understanding of the following description.

According to the invention, the compensating apparatus is formed of a linkage that inter-connects, preferably, the front idler and the front bogie wheels, the section of the track between these wheels being the location at which the greatest slack usually is produced. Under normal operating conditions, or, in other words, when no foreign matter is lodged in the track, the linkage is sufficiently rigid to permit an inter-dependent pivotal or swinging movement in these wheels, such as will compensate for track slack by causing one of the wheels to move a sufficient distance to take up slack produced by such movement in the other wheel as may be produced when the vehicle strikes a bump.

An important feature of this invention, however, is that, although the linkage is rigid under normal conditions, it also is somewhat resilient in that, when the tension in the track becomes excessive due to the lodging of foreign objects in its catenary, the linkage resiliently responds to permit an independent movement of one or both of the wheels. The independent movement contemplated is a yielding of one or both of the wheels that is sufficient to provide the slack necessary to reduce the excessive tension and permit the foreign object to work itself free. In the preferred form of the invention, the wheels are connected by a pivotal linkage which includes a torsion spring wound to such an extent that the force exerted on the wheels by the desired track tension is incapable of winding the spring any further and, as would be expected, the spring is held against unwinding by a suitable stop. However, the arrangement also is such, that, when an excessive track tension is produced, the force exerted by it is sufficient to further wind the torsion spring to thereby permit the linkage to elongate, such elongation causing one or the other of the wheels to yield a sufficient amount to provide the slack.

The preferred embodiment of the invention is illustrated in the drawings of which Fig. 1 is a side elevation of an amphibious track vehicle with a portion of its sponson wall broken away to show the arrangement of the track compensating apparatus; Fig. 2 a top view of the compensating apparatus; Fig. 3 a side elevation taken along line III—III of Fig. 2, and Fig. 4 a section of the torsion spring taken along line IV—IV of Fig. 3.

In the drawing, the vehicle shown has a hull 6 supported on a series of bogie wheels 8 which include a front bogie wheel 10, a front idler 12, and a rear sprocket 14, sprocket 14 providing the drive for a conventional metal track 16. As already stated, any slack produced usually accumulates toward the front end of the suspension system and, accordingly, the track compensating apparatus of this invention is disposed between and interconnects front idler 12 and bogie 10.

As to this linkage, it may be noted in Figs. 2 and 3, that front idler wheel 12 is rotatably mounted on a shaft 18 supported between two identical side carriers 20, these carriers including arms 20a, 20b and 20c forming triangular bell-crank levers interconnected by a rigid cross-bar 22. Support for the levers or carriers is provided by the vehicle hull and, for this purpose, the upper joint of their triangle (Fig. 3) is formed with a bearing pivotally supported on trunnions 24 provided in sponson plate 26 and hull plate 28 of the vehicle. These pivotal cranks form a part of the linkage interconnecting idler 12 and bogie 10 and the elements forming this connection are a pair of cables 30, each of which mount a toothed dog or retaining block 32 adapted to anchor or secure its cable in a selected, adjustable position on a toothed rack 33 provided on each leg 20c of the bellcranks. The retainer block is adjustably locked at various locations on rack 33 by a screw 34 to vary the cable tension and, therefore, to provide a fine adjustment of the track tension. As stated, the cables form a component part of the resilient linkage interconnecting the front idler wheel to the front bogie.

Front bogie wheels 10, which are linked to the idler, are mounted on a shaft 35 pivotally swung, in a manner to be described, on a shaft-supporting bogie arm 36 that, in turn, is mechanically coupled by means of cables 30 for movement with idler wheel carriers or levers 20. As shown in Figs. 2 and 3, shaft 35 is coupled to bogie arm 36 by a pair of laterally-spaced carriers 37, each of which is formed with angularly disposed arms 37a and 37b, arms 37a being swingably mounted on pin 38 projecting outwardly from each side of bogie arm 36. Bogie arm 36, in turn, has a hub portion 39 rotatably mounted on fixed shaft 40 that is supported by and bolted to sponson and hull plates 26 and 28. Also, the pivotal movement of front bogie wheel 10 is limited by adjustable screws 41 threaded into bogie arm 36, these screws serving as stops. A rubber bumper 42 contacts the bogie arm with the vehicle hull and serves primarily to absorb the initial shock when the track hits an obstacle.

The two component parts of the resilient linkage, namely, cables 30 and bogie arm 36, are joined through a preloaded spring unit 44 which, in the preferred embodiment shown in Fig. 4, is a torsion spring, such as the type manufactured under the trade name "Torsilastic" by the B. F. Goodrich Company. The "Torsilastic" spring 44 comprises a hollow shaft 46 freely rotatable on shaft 40 by suitable sleeve bearings 47. A central rubber sleeve portion 48 and two end rubber sleeve portions 50, one at each side of sleeve 48, surround hollow shaft 46 and are bonded to the shaft to provide a series type "Torsilastic" spring. Bogie arm hub 39 and two cable drums 52, one drum for each of sleeves 50, surround rubber sleeves 48 and 50, respectively, and may be bonded to the sleeves. However, as a manufacturing expedient, intermediate metal shells 54 and 56 are bonded directly around rubber sleeves 48 and 50 and hub 39 and cable drums 52 are mounted around and keyed to their respective shells. Lower ends of cables 30 are partially wrapped around the cable drums and are anchored around lips 58 (Figs. 2 and 3) on the cable drums.

The "Torsilastic" spring is loaded by rotating bogie arm 36 and cable drums 52 in opposite directions until a desired preset initial moment is obtained which corresponds to a predetermined limit of track tension at which the linkage is to yield. The spring is maintained in the wound preloaded condition by a rigid spacer bar 60 extending between and attached to radially-projecting fingers 62 each formed integral with one of the cable drums 52. Spacer bar 60 is positioned in the path of the bogie arm and abuts a projection 64 on the bogie arm to prevent the spring from unwinding. In this condition of the spring the resilient linkage, which includes the cables and associated drums, the "Torsilastic" spring and the bogie arm, operate as an assembly with the component parts in fixed relation to one another.

As long as the track tension remains below that corresponding to the preset condition of the "Torsilastic" spring, the resilient linkage pivots freely as a fixed assembly around shaft 40 with the interdependent movement of front bogie wheel 10 and front idler wheel 12 causing any movement of either of these wheels to produce an equal and opposite movement of the other wheel capable of taking-in and paid-out slack. Thus, if front bogie wheel 10 strikes an obstacle, the upward movement of the bogie wheel, which would otherwise release a portion of track length, is compensated by an outward thrust of the front idler wheel to take up the slack.

When the track tension for any reason rises to a point exceeding that corresponding to the preloaded condition of the "Torsilastic" spring, the spring is further wound beyond its initial torque setting and the important fact to be noted is that such further winding permits a yielding movement of the front idler wheel independently in relation to the front bogie wheel with a consequent release of sufficient track length to relieve the excess track tension. The particular action occurring is that the excess tension urges the front idlers in a counter-clockwise direction (Fig. 3) with such a force that the preset torque of the spring is exceeded and the pull on cables 30 is sufficient to move cable drums 52 in a clockwise direction to further wind the spring. Such further winding lengthens the extent of the cables between lips 58 and dogs 32 and, in so doing, permits the front idlers to yield to the excess tension. The yielding of the idlers, in turn, releases sufficient tension and permits the catenary to free itself of any foreign objects that may be caught in it.

To limit the further winding of the "Torsilastic" spring beyond its initial preset condition, a stop bar 66 may be provided for engaging bogie arm 36, as illustrated by broken lines in Fig. 3. The stop bar is fixed to and extends between two radially extending fingers 68, one formed integrally with each cable drum 52. According to the invention, a simple and compact track compensating apparatus is provided for an endless track vehicle which will eliminate any track slack caused by the pivotal movement of either the front bogie wheel or the front idler wheel during normal operating conditions of the vehicle over rough terrain. As the track length remains practically unchanged throughout these wheel movements, any accumulation of slack track between the drive sprocket and the last bogie wheel is prevented and the likelihood of the introduction of foreign matter in this part of the suspension systems is considerably reduced. The front bogie wheel has been incorporated in compensating apparatus in a manner that permits as much freedom of motion as is permitted in the remaining bogie wheels, so that the vehicle will have a smooth motion over rough terrain.

The other important feature of the compensating apparatus functions when track tension exceeds a predetermined limit such as might cause breakage or damage to the suspension system. In such instances, the track compensating apparatus through its resilient linkage permits such an independent yielding as to release sufficient track length to prevent damage to the suspension system. The "Torsilastic" spring which provides the yieldable property to the resilient linkage, is illustrated as a series spring, or a spring which has cables 30 and bogie arm 37 each connected to rubber sleeve portions adapted to permit a maximum angular windup of the spring. When space is available on the vehicle, a plain "Torsilastic" spring may be used, and in such construction the cables may be wrapped directly around hollow shaft 46 and only the bogie arm connected to a rubber sleeve, or, if desired, these connections may be reversed.

As another important advantage, it also should be noted that a fine adjustment in the track tension can be obtained without affecting the geometry of the linkage, since such an adjustment can be made simply by shifting the position of the upper ends of cables 30 through dog 32.

Obviously many modifications and variations of the present invention are possible in the light of the above teachings. It is, therefore, to be understood that within the scope of the appended claims the invention may be practiced otherwise than as specifically described.

I claim:

1. Apparatus for relieving excessive tension in a frame-mounted endless track, said apparatus comprising a pair of track-engaging wheels, a wheel-supporting arm swingably securing each of the wheels to said frame, and linkage interconnecting said arms and capable of normally translating movement of one arm to the other, said linkage including a tautened resilient member capable of maintaining under normal track tension a fixed length and of producing a fixed interdependent movement between said arms, and means for increasing said tautness sufficiently for producing said interdependent arm movement, said resilient member being capable of resiliently responding to track tensions exceeding a predetermined magnitude and said resilient response acting to vary said fixed length by permitting at least one of said arms to move relative to the other, said relative movement relieving said excess tension and permitting resumption of the adjusted tautness.

2. Apparatus for relieving excessive tension in a frame-mounted endless track, said apparatus comprising a pair of track-engaging wheels, a wheel-supporting arm swingably securing each of the wheels to said frame, and linkage interconnecting said arms capable of normally translating movement of one arm to the other, said linkage including a torsion spring preset in a loaded condition and capable of maintaining under normal track tensions a fixed length linkage and a fixed interdependent arm movement, and adjustable means connecting said spring to one of said arms for presetting said tautness, said spring being yieldable beyond said preset condition in response to track tensions exceeding a predetermined magnitude to increase said fixed length and permit one of said arms to move relatively to the other a sufficient amount for relieving said excess tension.

3. Apparatus for relieving excessive tension in a frame-mounted endless track, said apparatus comprising a pair of track-engaging wheels, a wheel-supporting arm swingably securing each of the wheels to said frame, and linkage interconnecting said arms for normally translating movement of one arm to the other, said linkage including a torsion spring preset in a loaded condition for maintaining under normal track tensions a fixed length linkage and a fixed interdependent arm movement, and a cable adjustably connecting said spring to one of said arms for presetting said tautness, said spring being yieldable beyond said preset condition in response to track tensions exceeding a predetermined magnitude to increase said fixed length and permit one of said arms to move relatively to the other a sufficient amount for relieving said excess tension.

4. Apparatus for relieving excessive tension in a frame-mounted endless track, said apparatus comprising a pair of track-engaging wheels, a wheel-supporting arm swingably securing each of the wheels to said frame, and linkage interconnecting said arms for normally translating movement of one arm to the other, said linkage including a torsion spring preset in a loaded condition for maintaining under normal track tensions a fixed length linkage and a fixed interdependent arm movement, and means for adjusting said tautness, said spring being yieldable beyond said preset condition in response to track tensions exceeding a predetermined magnitude to increase said fixed length and permit one of said arms to move relatively to the other a sufficient amount for relieving said excess tension; and said torsion spring comprising a rigid member, a rubber sleeve fixed to the rigid member, and stop means for holding said members in a fixed loaded condition adapted to cause said interdependent arm movement in response to normal track tensions, said rubber sleeve being connected to one of said wheel-supporting arms and said rigid member to said other arm.

5. Apparatus for relieving excessive tension in a frame-mounted endless track, said apparatus comprising a pair of track-engaging wheels, a wheel-supporting arm swingably securing each of the wheels to said frame, and linkage interconnecting said arms for normally translating movement of one arm to the other, said linkage including a torsion spring preset in a loaded condition for maintaining under normal track tensions a fixed length linkage and a fixed interdependent arm movement, and a cable adjustably connecting said spring to one of said arms for presetting said tautness, said spring being yieldable beyond said preset condition in response to track tensions exceeding a predetermined magnitude to increase said fixed length and permit one of said arms to move relatively to the other a sufficient amount for relieving said excess tension; and said torsion spring comprising a rigid member, a rubber sleeve fixed to the rigid member, and stop means for holding said members in a fixed loaded condition adapted to cause said interdependent arm movement in response to normal track tensions, said rubber sleeve being connected to one of said wheel-supporting arms and said rigid member to said other arm.

References Cited in the file of this patent

UNITED STATES PATENTS

| | | |
|---|---|---|
| 1,964,735 | Knox et al. | July 3, 1934 |
| 1,981,867 | Knox et al. | Nov. 27, 1934 |
| 2,149,297 | Knox | Mar. 7, 1939 |
| 2,436,681 | Swenson | Feb. 24, 1948 |
| 2,444,759 | Swennes | July 6, 1948 |
| 2,504,128 | Jacobson et al. | Apr. 18, 1950 |